United States Patent [19]

Schmer

[11] 4,175,182

[45] Nov. 20, 1979

[54] SEPARATION OF HIGH-ACTIVITY HEPARIN BY AFFINITY CHROMATOGRAPHY ON SUPPORTED PROTAMINE

[75] Inventor: Gottfried Schmer, Seattle, Wash.

[73] Assignee: Research Corporation, New York, N.Y.

[21] Appl. No.: 921,795

[22] Filed: Jul. 3, 1978

[51] Int. Cl.$^2$ .............................................. C07H 1/06
[52] U.S. Cl. ...................................... 536/21; 424/183
[58] Field of Search ........................... 536/21; 424/183

[56] References Cited

U.S. PATENT DOCUMENTS

| | | | |
|---|---|---|---|
| 2,552,507 | 5/1951 | O'Keeffe et al. | 536/21 |
| 2,989,438 | 6/1961 | Nomine et al. | 424/183 |
| 3,099,600 | 7/1963 | Toccaceli et al. | 536/21 |
| 3,451,996 | 6/1969 | Sumyk et al. | 536/21 |

Primary Examiner—Johnnie R. Brown
Attorney, Agent, or Firm—Holman & Stern

[57] ABSTRACT

An affinity chromatography method for the separation of high-activity heparin from a mixture thereof with low-activity heparin. The method employs an affinity column of protamine coupled to a water-insoluble solid support material such as agarose, and a series of sodium chloride-imidazole elution buffers (pH 6.5–7.5) varying in sodium chloride molarity from about 1.3 to about 2.0. Stepwise elution of a plurality of heparin fractions from the affinity column with the elution buffers of successively increasing sodium chloride molarity results in the removal from the affinity column of first the low-activity heparin and finally the high-activity heparin.

7 Claims, No Drawings

SEPARATION OF HIGH-ACTIVITY HEPARIN BY AFFINITY CHROMATOGRAPHY ON SUPPORTED PROTAMINE

The invention described herein was made in the course of work under a grant or award from the Department of Health, Education and Welfare.

BACKGROUND OF THE INVENTION

This invention relates generally to the isolation of high-activity heparin and, more particularly, to the separation of heparin into fractions of relatively high specific activity and relatively low specific activity by affinity chromatography.

Heparin is a highly sulphated dextrorotatory mucopolysaccharide which is commonly employed in various biomedical applications for its anticoagulant properties in prolonging the clotting time of whole blood. It is typically isolated from mammalian tissue, such as animal livers, lungs or intestines, and thereafter purified by methods well known in the art. The anticoagulant potency of the isolated and purified heparin, is generally referred to as its "specific activity" and expressed as IU/mg.

Commercially available heparin typically has a specific activity of approximately 150 IU/mg, and has previously been shown to be composed of a mixture of different heparin species varying in their specific activities. Recent use of heparin as a coating for biomaterials exposed to blood has prompted a search for methods capable of separating the most active fractions. Several different techniques have previously been proposed for effecting a separation of the heparin of relatively high specific activity out of its mixture with heparin of relatively low specific activity, including gel filtration, sucrose density gradient centrifugation after binding with antithrombin III, affinity chromatography on antithrombin III-agarose, ion-exchange chromatography on DEAE-cellulose, and electrofocusing. However, all of these procedures permit fractionation of only small quantities of heparin, and have not proved to be practical for the large scale isolation of high-activity heparin in high yield.

SUMMARY OF THE INVENTION

It is, accordingly, a primary object of this invention to provide an improved procedure for the isolation of high-activity heparin in relatively high yields practical for large commercial production.

Another object of the invention is to provide an improved procedure for the separation of high-activity heparin from a mixture thereof with low-activity heparin employing affinity chromatography techniques.

A further object of the invention is to provide an improved procedure for the isolation of high-activity heparin in accordance with the preceding objects, which is relatively simple and economical to perform.

The above and other objects are achieved in accordance with the present invention by providing an affinity chromatography method by which commercially available heparin may be readily separated into fractions of relatively high specific activity and relatively low specific activity. The method utilizes an affinity column composed of protamine coupled to a water-insoluble solid support material such as agarose. The mixture of high-activity heparin and low-activity heparin (e.g., commercially available heparin) is dissolved in a solvent of about 0.6 molar sodium chloride buffered with about 0.01-0.03 molar imidazole to pH 6.5-7.5, and the resulting heparin solution is then applied onto the affinity column. Thereafter, a plurality of heparin fractions are successively eluted from the affinity column with a series of elution buffers of successively increasing molarity of sodium chloride buffered with about 0.01-0.03 molar imidazole to pH 6.5-7.5. The elution buffers employed have a sodium chloride molarity ranging from about 1.3 to about 2.0. In this manner, there is effected a stepwise removal from the affinity column of first the heparin of relatively low specific activity and finally the heparin of relatively high specific activity.

DESCRIPTION OF PREFERRED EMBODIMENTS

The affinity chromatography method of the present invention employs an affinity column composed of protamine coupled to a water-insoluble solid support material. Protamine is a simple protein material which is obtained from the sperm of certain fish, yields basic amino acids on hydrolysis, and which is used in medicine to neutralize heparin and to control hemorrhage.

Suitable water-insoluble solid support materials include, for example, agarose, cross-linked dextrans such as Sephadex, hydroxyl-modified polyacrylates such as hydroxyl ethyl methacrylate polymer, agaropectin, collagen, glass, silica clays, cellulose derivatives, and the like. The preferred support material is agarose, for example, Sepharose gel manufactured by Pharmacia Fine Chemicals, Uppsala, Sweden.

Preparation of the affinity column material may be carried out by the standard coupling techniques well known in the art, for example, the cyanogen bromide coupling technique (Cuatrocasas, J. Biol. Chem. 245, 3059, 1970), wherein the support material is first activated with cyanogen bromide, and the protamine thereafter coupled to the activated support material.

The heparin starting material employed in the method of the present invention is composed of a mixture of heparin of relatively high specific activity and heparin of relatively low specific activity, such as heparin commercially available from various sources, for example, Abbott Laboratories, North Chicago, Ill., and Sigma Chemical Company, St. Louis, Mo. A loading solution of the heparin mixture is prepared by dissolving the heparin mixture in a solvent of about 0.6 molar sodium chloride buffered with about 0.01-0.03 molar imidazole to pH 6.5-7.5. Preferably, such solvent is buffered with 0.02 molar imidazole to pH 7.35.

Prior to use, the affinity column should be equilibrated with the same solvent used in preparing the heparin loading solution, i.e., 0.6 molar sodium chloride buffered with about 0.01-0.03 molar imidazole to pH 6.5-7.5. Thereafter, the heparin loading solution is applied onto the affinity column.

The heparin is then eluted from the affinity column in a plurality of fractions by successive elution with a series of sodium chloride-imidazole elution buffers of successively increasing sodium chloride molarity ranging from about 1.3 to about 2.0. Each of the elution buffers is buffered with about 0.01-0.03, preferably 0.02, molar imidazole to pH 6.5-7.5, preferably 7.35. The stepwise elution is preferably carried out so as to obtain four separate heparin fractions, employing a first elution buffer having a sodium chloride molarity of from about 1.3 to about 1.4, a second elution buffer having a sodium chloride molarity of from about 1.4 to about 1.7, a third elution buffer having a sodium chloride molarity of from about 1.7 to about 1.9, and a fourth elution buffer having a sodium chloride molarity of from about 1.9 to about 2.0.

In this manner, there is effected a stepwise removal from the affinity column of first the heparin of relatively low specific activity and finally the heparin of relatively high specific activity. The penultimate heparin fraction eluted with the elution buffer having a sodium chloride molarity of from about 1.7 to about 1.9, will generally have a specific activity ranging from about 210 to about 260 IU/mg. The final heparin fraction eluted with the elution buffer having a sodium chloride molarity of from about 1.9 to about 2.0, will generally have a higher specific activity ranging from about 270 to about 305 IU/mg.

The invention is further illustrated by way of the following examples.

EXAMPLE 1

For the preparation of protamine-Sepharose gel, 500 ml of Sepharose 4B swollen in distilled water was equilibrated with 0.2 M $Na_2CO_3$, then suspended in one liter of 0.2 M $Na_2CO_3$, and 100 g cyanogen bromide in 100 ml dimethyl formamide added. The temperature was maintained between 15° and 20° C. by the addition of crushed ice, and the pH was maintained by the dropwise addition of 50% sodium hydroxide. After ten minutes, the gel was washed in a Buchner funnel under suction with 5 liters cold (4° C.) 0.15 M sodium phosphate buffer, pH 7.0, and with one to two liters of distilled water, (4° C.). Suction was continued until excess water was removed. 500 ml of 2% (w/v) protamine in 0.2 M sodium bicarbonate were then added to the wet gel, and the pH adjusted to 8.2 by the addition of 1 M NaOH. Incubation with gentle stirring for two and a half hours at room temperature was followed by washing sequentially with 10 liters of distilled water, 10 liters of normal saline and 5 liters of 1 M sodium chloride. Final equilibration was with 0.15 M sodium chloride, 0.02 M imidazole, pH 7.35. The resulting protamine-Sepharose gel was stored with 0.02% sodium azide at 4° C.

EXAMPLE 2

A plastic affinity column (0.9×16 cm) packed with protamine-Sepharose gel as prepared in Example 1 above, was equilibrated with 0.6 molar sodium chloride-0.02 molar imidazole buffer solution, pH 7.35. A heparin loading solution was prepared by dissolving 100 mg commercial heparin (Sigma Chemical Co., specific anticoagulant activity 158.7 IU/mg) in 2 ml of 0.6 molar sodium chloride-0.02 molar imidazole buffer solution, pH 7.35. The loading solution was applied onto the equilibrated protamine-Sepharose affinity column. Gradient elution was then carried out with a series of elution buffers of successively increasing molarity of sodium chloride ranging from 1.3 to 2.0, buffered with 0.02 molar imidazole to pH 7.35. The eluates were pooled into four separate fractions over the eluant sodium chloride molarity ranges of 1.3-1.4, 1.4-1.7, 1.7-1.9, and 1.9-2.0, respectively. A 2.5×30 cm column of Sephadex G-25 equilibrated with distilled water was used for desalting the pooled fractions. Each of the pooled fractions was then analyzed for heparin specific activity by both the kaolin activated partial thromboplastin time assay of Proctor et al (AM. J. CLIN. PATH. 36:212-219, 1961) and the $X_a$ neutralization assay of Yin et al (J. LAB. CLIN. MED. 81:298-310, 1973).

The results obtained when carrying out the above-described elution procedure on five separate protamine-Sepharose affinity columns, are set forth in Table I, below, wherein the heparin specific activity values given represent the means values and the deviations therefrom over the five columns.

TABLE I

| Pooled Fraction | Eluant NaCl Molarity | Heparin Specific Activity (IU/mg) |
|---|---|---|
| I | 1.3–1.4 | 47.1 ± 14.3 |
| II | 1.4–1.7 | 167.6 ± 19.4 |
| III | 1.7–1.9 | 234.3 ± 26.2 |
| IV | 1.9–2.0 | 285.8 ± 18.6 |

The embodiments of the invention in which an exclusive property or privilege is claimed are defined as follows:

1. An affinity chromatography method for the separation of heparin having a specific activity of at least about 270 IU/mg from a mixture thereof with heparin of lower specific activity, comprising the steps of:
   (a) preparing a solution of said heparin mixture in a solvent of about 0.6 molar sodium chloride buffered with about 0.01–0.03 molar imidazole to pH 6.5–7.5;
   (b) applying said heparin solution onto an affinity column composed of protamine coupled to a water-insoluble solid support material; and
   (c) successively eluting a plurality of heparin fractions from said affinity column with a series of elution buffers of successively increasing molarity of sodium chloride buffered with about 0.01–0.03 molar imidazole to pH 6.5–7.5, said elution buffers having a sodium chloride molarity ranging from about 1.3 to about 2.0, so as to effect a step-wise removal from said affinity column of first the heparin of lower specific activity and finally the heparin having a specific activity of at least about 270 IU/mg.

2. The method of claim 1, wherein the elution buffer employed in eluting the final heparin fraction having a specific activity of at least about 270 IU/mg has a sodium chloride molarity of from about 1.9 to about 2.0.

3. The method of claim 2, wherein the elution buffer employed in eluting the penultimate heparin fraction has a sodium chloride molarity of from about 1.7 to about 1.9.

4. The method of claim 3, wherein said series of elution buffers comprises a first elution buffer having a sodium chloride molarity of from about 1.3 to about 1.4, a second elution buffer having a sodium chloride molarity of from about 1.4 to about 1.7, a third elution buffer having a sodium chloride molarity of from about 1.7 to about 1.9, and a fourth elution buffer having a sodium chloride molarity of from about 1.9 to about 2.0.

5. The method of claim 4, wherein said solvent and each of said elution buffers is buffered with 0.02 molar imidazole to pH 7.35.

6. The method of claim 1, wherein said affinity column is equilibrated with an additional amount of said solvent prior to application of said heparin solution.

7. The method of claim 1, wherein said support material is agarose.

* * * * *